Nov. 20, 1928.

N. STATHAM 1,691,999

FLEXIBLE FASTENING DEVICE AND MEANS FOR OPERATING THE SAME

Filed Jan. 31, 1925

Noel Statham INVENTOR

BY Edward M. Evarts his ATTORNEY

Patented Nov. 20, 1928.

1,691,999

UNITED STATES PATENT OFFICE.

NOEL STATHAM, OF IRVINGTON-UPON-HUDSON, NEW YORK.

FLEXIBLE FASTENING DEVICE AND MEANS FOR OPERATING THE SAME.

Application filed January 31, 1925. Serial No. 5,910.

My present invention relates to flexible fastening devices such as are intended, for example, to close the seams of shoes, corsets, dresses and other garments, and the openings of bags, pouches and other devices, and aims to devise means of the general character specified above which are simple in construction, easy and convenient to fabricate and to assemble, convenient in operation, and quite economical, so that they may be applied very widely for the designated purpose.

In the accompanying specification I shall describe, and in the annexed drawing show, several illustrative embodiments of the present invention. It is, however, to be clearly understood that my invention is not limited to the specific embodiments thereof herein shown and described for purposes of example merely.

Referring to the drawing, wherein I have illustrated the aforesaid illustrative embodiments of the present invention:

Fig. 1 is a plan view of a flexible fastener forming one of the aforesaid illustrative embodiments of the present invention, showing the key or operating member mounted upon the cooperating tapes carrying the cooperating fasteners constituting the flexible fastener referred to;

Figure 1:
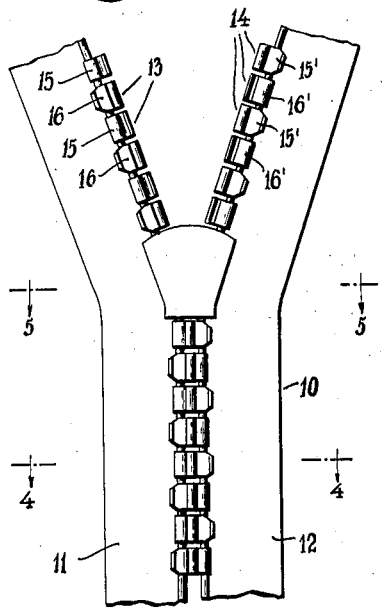
Figure 2:
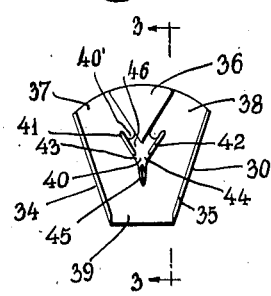
Fig. 2 is a longitudinal sectional view, taken along line 2—2 of Fig. 3 of the drawing, of the key or operating member shown in Fig. 1 of the drawing, certain of the fastening members being shown in position within said key or operating member to indicate the mode of operation of the key or fastening member for closing and opening the flexible fastener member.
Figure 3:
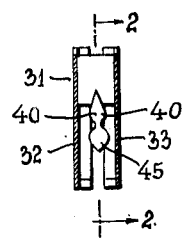
Fig. 3 is a longitudinal sectional view, taken along line 3—3 of Fig. 2 of the drawing, further illustrating the key or operating member shown in Figs. 1 and 2 of the drawing.
Figure 4:
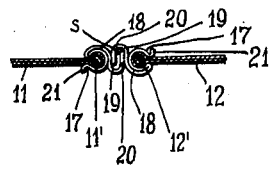
Figure 5:
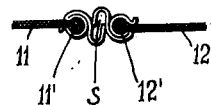
Figure 8:
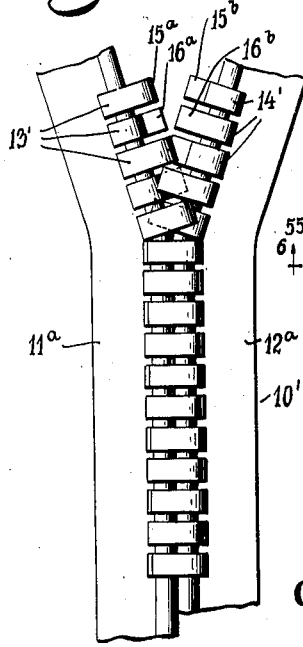
Figure 6:
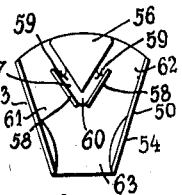
Figure 9:
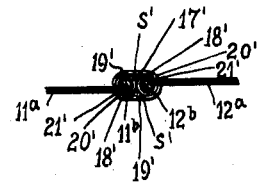
Figures 7, 10, 11:
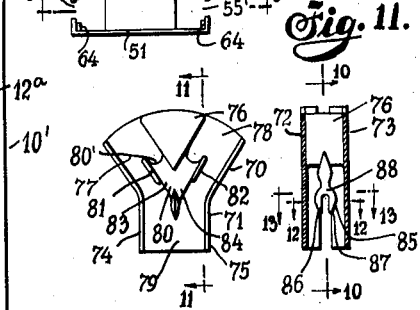
Figures 12, 13:
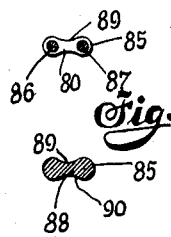

Fig. 4 is an enlarged cross-sectional view taken along line 4—4 of Fig. 1 of the drawing, showing two complementary fasteners on the corresponding fastener tapes in interlocked or closed position; and Fig. 5 is a view similar to Fig. 4, taken along line 5—5 of Fig. 1 of the drawing, showing a pair of cooperating fasteners mounted on the corresponding fastener tapes in unlocked or open position, the key portions being omitted to make the showing clearer;

Fig. 6 is a longitudinal sectional view, similar to Fig. 2 of the drawing, taken along line 6—6 of Fig. 7 of the drawing, showing a modified form of key or operating member which may be used in connection with the type of flexible fastener illustrated in Figs. 1, 4 and 5 of the drawing; and Fig. 7 is a top plan view further illustrating the modified form of key or operating member illustrated in Fig. 6 of the drawing;

Fig. 8 is a plan view of a modified form of flexible fastener;

Fig. 9 is a cross sectional view illustrating the arrangement of cooperating fasteners embodied in the flexible fastener illustrated in Fig. 8 of the drawing;

Fig. 10 is a longitudinal sectional view, similar to Figs. 2 and 6 of the drawing, taken along line 10—10 of Fig. 11 of the drawing, showing a further modified form of key or operating member which may be used in connection with the type of flexible fastener illustrated in Figs. 8 and 9 of the drawing;

Fig. 11 is a longitudinal sectional view, taken along line 11—11 of Fig. 10 of the drawing, further illustrating the modified form of key or operating member illustrated in Fig. 10 of the drawing;

Fig. 12 is a detailed cross sectional view of the tongue or spreading member of the modified form of key or operating member illustrated in Figs. 10 and 11 of the drawing and taken along line 12—12 of Fig. 11 of the drawing; and Fig. 13 is a view similar to Fig. 12, but taken along line 13—13 of Fig. 11 of the drawing, showing in detailed cross sectional view the tongue or spreading member forming a part of the key or operating member illustrated in Fig. 12 of the drawing.

Referring now more particularly to the embodiment of the invention illustrated in Figs. 1, 2, 3, 4 and 5 of the drawing, the flexible fastener therein illustrated and generally designated by reference character 10 is preferably made up of a plurality of flexibile supporting members 11 and 12 carrying the co-operating sets of fasteners 13 and 14, respectively.

From one point of view the tapes 11 and 12 carrying the respective groups of cooperating fasteners 13 and 14 are substantially identical, and in fact from the manufacturing point of view are identical, since the one fastener tape carrying its set of fasteners corresponds to the other fastener tape carrying its set of fasteners with the sole difference that the tapes and their corresponding fasteners are opposed to each other in identical form except for displacement by a space corresponding to the space occupied by one of the fasteners. That is, the tape 11, for example, carries a set of fasteners 13 alternately comprising left and right hand fasteners 15 and 16, respectively, while the corresponding tape 12 carries the fasteners 14 comprising alternately the right and left hand fasteners 15' and 16', respectively. Similarly, the fasteners 15, 16, 15' and 16' are all identical and may be made from a single die in a single stamping or equivalent operation, differing from each other merely in their respective positions on the supporting tapes 11 and 12 when the latter are in assembled relation and from their being in upright or inverted position, depending on which of the fasteners are considered to be in upright or left hand, and which in reversed or right hand, position.

The arrangement of the cooperating fasteners is fully illustrated in Figs. 4 and 5 of the drawing. While not limited thereto, I prefer that the fasteners shall be attached to their respective supporting tapes in the following manner: The tapes 11 and 12 are preferably provided with the beaded edges 11' and 12', respectively. For cooperation with such beaded edges the fasteners 15, 16, 15' and 16' are provided with the beaded portions 17 adapted to fit over the beaded edges of the corresponding supporting tapes. The beaded portions 17 of the fasteners provide attaching means for attaching the fasteners to the corresponding supporting tapes.

The fasteners 15, 16, 15' and 16', in addition to the beaded or equivalent attaching portions 17 already referred to, preferably comprise the hook or locking portions 18, which are preferably integral with and form extensions of the beaded or other attaching portions 17. For this purpose each interlocking or hook portion 18 may comprise the main or shank portion 19 and the hook 20, all as clearly illustrated in Figs. 4 and 5 of the drawing. It will be noted, as will readily appear from an inspection of Figs. 4 and 5 of the drawing, that the hooks 20 of successive fasteners on the same tape alternately point in opposite directions and that the hook portions of corresponding fasteners on the cooperating supporting tapes likewise point in opposite directions so as to enable the hook portions of corresponding fasteners as carried by the cooperating supporting tapes to interlock under the conditions described in greater detail hereinafter.

For the purpose of causing the cooperating fasteners carried by the cooperating supporting tape members to normally tend to remain in interlocked or engaged position, thereby closing the seam of the garment or other device, with which the flexible fasteners of the present invention are intended to be employed, I may provide torsion or equivalent means tending to cause such fasteners to become and remain interlocked or engaged until disengaged by the operation of the key or operating member subsequently described. For this purpose I prefer to so arrange the fasteners 15, 16, 15' and 16' upon their respective supporting tapes 11 and 12 that when the fasteners are in the interlocked or engaged position illustrated in Fig. 4 of the drawing they are maintained in such position by a slight torsional or equivalent force brought about by the engagement of the lip members 21 forming a part of the beaded or attaching portions 17 on the respective tape portions 11 and 12, which torsional or equivalent force is considerably increased when the fasteners are operated into disengaged or open position shown in Fig. 5 of the drawing. This increase in the torsional or equivalent force is brought about by the increased distortion of the supporting tapes 11 and 12 out of their normally flat positions by the engagement of the lip portions 21 with such tapes as clearly shown in Fig. 5 of the drawing, as well as by the torsional force exerted on or by the cord or cable preferably constituting a part of the beaded edge of each of the supporting tapes 11 or 12. In many instances I prefer to use a wire cable to form part of such beaded edge to produce the desired torsional effect.

In order to operate the cooperating tape members carrying the cooperating sets of fasteners into and out of closed position, I provide a suitable key or operating member generally designated by reference character 30 and preferably comprising in the present instance a housing 31 comprising the two face walls 32 and 33, and the slotted end walls 34 and 35, through which the tapes 11 and 12 pass, together with the enclosed wedge-shaped member 36, all defining between them the more or less arcuate channels 37 and 38 which meet in the opening 39. Attached to or forming a part of the wedge-shaped member 36 is a wedge-shaped member comprising a web portion 40 carrying the flanged portions 41 and 42 which extend both above and below the plane of the web portion 40, as shown more clearly in Fig. 3 of the drawing, and which extend above the upper edge 40' of the web portion 40, all as shown more clearly in Fig. 2 of the drawing. The flange members 41 and 42 terminate above the lower point of the web member 40 so as to provide the openings or breaks 43 and 44 to one side and similar breaks to the other side of the plane of the web portion 40. At 45 I have indicated a transverse wedge-shaped member which is preferably tapered or pointed, as shown more clearly in Fig. 3 of the drawing, so as to be capable of entering between the cooperating hook portions 20 of cooperating fasteners in the act of operating the flexible fastener into open position.

The operation of the device described above will be substantially clear from the foregoing description and may be briefly summarized as follows: Assuming that the flexible fastener comprising the aforesaid illustrative embodiment of the present invention is in the closed position indicated by the lower portion of Fig. 1 of the drawing, and that it is desired to operate such fastener into open position, the key or operating member 30 is thereupon, for this purpose, moved downwardly in the position shown in Fig. 1 of the drawing. This causes the pointed or tapered transverse wedge-shaped member 45 to enter into the space s between the cooperating fasteners and thus to disengage the hooks 20 of such cooperating fasteners from each other from the position shown in Fig. 4 of the drawing into the position shown in Fig. 5 of the drawing. The further operation of the key or operating member 30 downwardly in the position shown in Fig. 1 of the drawing brings about the further separation of the hooks 20 of the cooperating fasteners by the further penetration of the tapering or pointed transverse wedge-shaped member 45 into the space s.

Thereupon one of the hooks 20 of one of the cooperating fasteners rides in the channel 46 defined between the flange portion 41 and the wedge-shaped member 36 of the key or operating member 30, for example, and finally passes out through the break or opening 44 on one side of the web portion 40, while the other hook 20 of the remaining cooperating fastener rides in the channel on the other side of the web 30 defined between the flange portion 42 and the wedge-shaped member 36 of the key or operating member 30, until it passes out through the break or opening 43 on the lower side of the web portion 40, as shown in Fig. 2 of the drawing. Meanwhile, the respective flange portions 41 and 42 have been engaged within the bends of the hook portions 20 of the cooperating fasteners, as will readily occur to those skilled in the art to which the present invention relates.

As the key or operating member 30 continues its downward movement along the flexible fastener 10 in the position indicated in Fig. 1 of the drawing, it enters the space s of the next lower pair of cooperating fasteners and opens these in the manner already described for the first pair of cooperating fasteners as set forth in detail above. The only difference is that whereas in the case of the first pair of cooperating fasteners described above the hook portions 20 of the same, point, for example, to the left and to the right, the hook portions 20 of the next lower pair of cooperating fasteners point to the right and to the left, respectively. This will therefore cause the hook portions of the last-mentioned pair of cooperating fasteners to enter within the channels on the opposite sides and also on the opposite faces of the web portion 30. Otherwise, the operation of the key or operating member 30 in opening the next lower pair of cooperating fasteners is the same as that described for the first pair of fasteners described above. The continued operation of the key or fastener 30 in downward direction as shown in Fig. 1 of the drawing continues to open one pair of fasteners after another, the hook portions of succeeding pairs of fasteners pointing in opposite directions but the manner of their operation into open position being substantially the same except for the one difference of direction already noted.

In operating the flexible fastener 10 into closed position, the reverse series of operations already described for opening the fastener is followed. That is; the key or operating member 30 is moved upwardly along the flexible fastener 10 in the position shown in Fig. 1 of the drawing, this movement, by reason of the guidance afforded by the wedge-shaped member 36 and the web portion 40 and associated flanges 41 and 42 and the associated transverse wedge member 45, together with the breaks or interruptions 43 and 44 in the flanges 41 and 42, respectively, guiding the disengaged fasteners from the open position shown in Fig. 5 of the drawing into the closed position shown in Fig. 4 of the drawing. Pair after pair of fasteners is closed by this operation, the closing action being facilitated by the torsional or equivalent force under which the tapes are placed when in the position shown in Fig. 5 of the drawing under the action of the key or operating member 30 as it approaches the position for closing a particular pair of fasteners.

Referring now more particularly to the illustrative embodiment of the invention shown in Figs. 6 and 7 of the drawing, the key or operating member there shown and generally designated by reference character 50 comprises the face walls 51 and 52 and the end walls 53 and 54 providing the slots 55 and 55′ through which pass the tapes 11 and 12 carrying the fasteners. The members 51, 52, 53 and 54 are preferably held together and carried by a wedge-shaped member 56, as by being soldered thereto. The wedge-shaped member 56 carries the web portion 57 which is approximately wedge-shaped, the web portion 57 in turn carrying the flange members 58. There are thus defined between the wedge-shaped member 56 and the flange portions 58, which flange portions preferably extend on each side above and below the web portion 57, a plurality of, here shown as four, channels 59, two on one side, one on each side of the wedge-shaped member 56, and two on the other side, likewise one on each side of the wedge-shaped member 56, of the web portion 57. The channels 59 on each side of the web portion 57 meet in a common opening 60.

Similarly there are defined between the end faces of the wedge member 56 and the end walls 53 and 54 of the housing for the key or operating member 50 the substantially arcuate channels 61 and 62 which meet in the common opening 63, as shown more clearly in Fig. 6 of the drawing. The key or operating member 50 thus described is preferably provided with a plurality, herein shown as four, ridges or elevated portions 64, one preferably in each corner at the junction between the face walls 51 and 52 and the end walls 53 and 54, respectively. The purpose of these ridges is, in the act of operating the flexible fastener 10 of the present invention into open position, to be brought to bear down, by a sort of cam action, upon the lips or extensions 21 of each fastener. In the case of a particular pair of cooperating fasteners which it is desired to operate into open position, a pair of diametrically opposite cams or ridges 64 will be brought into play for this purpose. For the next lower pair of cooperating fasteners the remaining pair of diametrically opposite cams or ridges 64 is brought into play for opening the last-mentioned pair of cooperating fasteners, and so on, each succeeding pair of cooperating fasteners being brought into open position by alternate diagonally disposed pairs of the cams or ridges 64.

The mode of operating the key or operating member 50 for the purpose of opening the flexible fastener 10 of the present invention has already been described with sufficient detail above. In operating the flexible fastener 10 into closed position from the open position shown in Fig. 5 to the closed position shown in Fig. 4 of the drawing, the key or operating member 50 is now moved upwardly instead of downwardly in the position shown in Fig. 1 of the drawing. This brings about the reverse operation already described for the operation of the flexible fastener into open position. The action of the key or operating member 50 to close the fasteners is facilitated by the torsional or equivalent force which is exerted by the fasteners on their respective supporting tapes by the engagement of the respective cams or ridges 64 with the raised lips or beads 21 of the fasteners as the key or operating member 50 approaches the position for closing each fastener. Otherwise, the construction and mode of operation of the flexible fastener embodying this type of operating member is the same as for the flexible fastener already described above in connection with the description of Figs. 2, 3, 4 and 5 of the drawing.

Referring now more particularly to the illustrative embodiment of the invention shown in Figs. 8 and 9 of the drawing, the flexible fastener tape there shown and generally designated by reference character 10' is preferably made up of a plurality of supporting members 11$^a$ and 12$^a$ carrying the cooperating sets of fasteners 13' and 14', respectively.

As in the case of the tapes 11 and 12 carrying the respective groups of cooperating fasteners 13 and 14 described in detail above, the cooperating fasteners 13' and 14' are substantially identical and from the manufacturing point of view are in fact identical, since one fastener tape carrying its set of fasteners corresponds to the other fastener tape carrying its set of fasteners with the sole difference that the tapes and their corresponding fasteners are displaced with respect to each other by one fastener or the space corresponding to one fastener, that is, the tape 11$^a$, for example, carries a set of fasteners 13' alternately comprising left and right hand fasteners 15$^a$ and 16$^a$ respectively, while the corresponding tape 12$^a$ carries the fasteners 14' comprising alternately the right and left hand fasteners 15$^b$ and 16$^b$, respectively. Similarly, the fasteners 15$^a$, 16$^a$, 15$^b$ and 16$^b$ are all identical and may be made from a single die in a single stamping or equivalent operation. That is, these various fasteners differ from each other merely in their respective positions on the supporting tapes 11$^a$ and 12$^a$ when the latter are in assembled relation and from their being in upright or inverted position, depending on which of the fasteners are intended to be in upright or left hand, and which in reversed or right hand, position.

As in the case of the flexible fastener illustrated in Figs. 1, 4 and 5 of the drawing, I prefer that the fasteners 15$^a$, 16$^a$, 15$^b$ and 16$^b$, shall be attached to their respective supporting tapes in the following manner: The tapes 11$^a$ and 12$^a$ are preferably provided with the beaded edges 11$^b$ and 12$^b$, respectively. For cooperation with said beaded edges the fasteners 15$^a$, 16$^a$, 15$^b$ and 16$^b$, are provided with the beaded portions 17' adapted to fit over the beaded edges 11$^b$ and 12$^b$ of the corresponding supporting tapes. The beaded portions 17' of the fasteners provide attaching means for attaching the fasteners to the corresponding supporting tapes.

The fasteners 15$^a$, 16$^a$, 15$^b$ and 16$^b$, in addition to the beaded or equivalent attaching portions 17' already referred to, preferably comprise the hook or locking portions 18', which are preferably integral with and form extensions of the beaded or other attaching portions 17'. For this purpose each interlocking or hook portion 18' may comprise the main or shank portion 19' and the hook 20', all as clearly illustrated in Figs. 8 and 9 of the drawing.

It will be noted, as will readily appear from an inspection of Figs. 8 and 9 of the drawing, that the hooks 20' of successive fasteners on the same tape alternately point in opposite directions and that the hook portions of corresponding fasteners on the cooperating supporting tape likewise point in opposite directions, so as to enable the hook portions of corresponding fasteners carried by the respective cooperating supporting tapes to interlock under the conditions now to be described. For facilitating the interlocking operation, each hook 20' preferably enters into the space or gap 21' adjacent the corresponding supporting tape on the opposite side of the tape from the side carrying the hook member 18' comprising the shank portion 19' and the hook 20'. The space 21' is so positioned and designed that it will firmly retain the hook 20' in the closed or interlocked position of the two supporting tapes and the fasteners carried thereby.

For operating the flexible fasteners shown in Figs. 8 and 9 of the drawing, I prefer to employ a key or operating member generally designates by reference character 70 as illustrated in Figs. 10, 11, 12 and 13 of the drawing and comprising a housing 71 embodying the two face walls 72 and 73 and the two slotted end walls 74 and 75, through which the tapes 11ª and 12ª are adapted to pass. The key or operating member 70 also includes the enclosed wedge-shaped member 76 to which the face walls 72 and 73 may be suitably attached, as by soldering. The wedge-shaped member 76 and the end walls 74 and 75 define between them the more or less arcuate channels 77 and 78 which meet in the common opening 79.

Attached to or forming a part of the wedge-shaped member 76 is a wedge-shaped member comprising a web portion 80 carrying the flange portions 81 and 82 which extend both above and below the plane of the web portion 80 as shown more clearly in Fig. 11 of the drawing. The flange portions 81 and 82 extend also above the upper edge 80' of the web portion 80, all as shown more clearly in Fig. 10 of the drawing. The flange members 81 and 82 terminate above the lower point of the web member 80 so as to provide the openings or breaks 83 and 84 to one side and similar breaks to the other side of the web portion 80.

At 85 I have indicated a transverse double-pronged member which is preferably tapered downwardly and provided with two prongs or points so as to be capable of entering into the spaces s' defined between cooperating fasteners and thus to disengage the hooks 20' of such cooperating fasteners from each other from the closed position shown in Fig. 9 of the drawing into open position. The transverse double-pronged member 85, shown in detailed sections in Figs. 12 and 13 of the drawing, is provided with two prongs or points 86 and 87 which join or meet in a portion 88 more clearly shown in Fig. 13 of the drawing. So that the action of the key or operating member 70 and particularly of the double-pronged transverse member 85 may be facilitated, I prefer that the face portions of the member 85 shall be slightly concave, as indicated by reference characters 89 and 90 of the drawing.

The operation of the key or operating member 70 described in detail above, in operating the flexible fastener shown in Figs. 8 and 9 of the drawing into and out of closed or locked position will be substantially clear from the foregoing description and may be briefly summarized as follows: Assuming that the flexible fastener 10' is in the closed position indicated at the lower portion of Fig. 8 and by Fig. 9 of the drawing, and that it is desired to operate such fastener into open position, the key or operating member 70 is threaded onto the two cooperating tape members 11ª and 12ª carrying the respective fasteners, and is thereupon moved downwardly in the position shown in Fig. 8 of the drawing. This causes the points of the prongs 86 and 87 to enter into the respective spaces s' between the cooperating fasteners and thus to spread such fasteners apart and disengage the hook portions 20' of such cooperating fasteners from the beaded portions of the respective supporting tapes. The further operation of the key or operating member 70 downwardly in the position shown in Fig. 1 of the drawing brings about the separation of further pairs of cooperating fasteners until the flexible fastener 70 has been opened to the desired extent. This operation is facilitated by means of the flange members 81 and 82 and the channels defined between such flange members and the wedge-shaped member 76.

In operating the fastener 10' into closed position, the reverse series of operations already described for opening the fastener is followed. That is, the key or operating member 70 is moved upwardly along the flexible fastener 10' in the position shown in Fig. 1 of the drawing. This movement, by reason of the guidance afforded by the wedge-shaped member 76 and the web portion 80 and associated flanges 81 and 82, and the associated transverse web portion 85, together with the breaks or interruptions 83 and 84 in the flanges 81 and 82, respectively, guides the disengaged fasteners from the open position in which they now are into the closed position shown in Fig. 9 of the drawing. Pair after pair of fasteners is closed by this operation, in a manner which will be readily apparent to those skilled in the art to which the present invention relates.

The flexible fastener devices of the present invention are characterized by their great simplicity, the ease and economy with which they can be manufactured and assembled, requiring as they do merely a single die or equivalent device for stamping or otherwise shaping all of the fasteners. The flexible fastening devices of the present invention are further characterized by their ease, convenience and certainty in operation, the long life and wear of such fasteners, and the fact that their cheapness enables the same to be applied to a wide variety of devices, such as shoes, corsets, dresses and other garments, as well as bags, pouches and other devices, for which a more expensive and complicated fastening device would not be practically available. Other advantages of the present invention will readily occur to those skilled in the art to which the same relates.

What I claim as my invention is:

1. A flexible fastener comprising a plurality of flexible supporting members, a plurality of fasteners carried by each of said members, the fasteners carried by one of said flexible supporting members having hook portions adapted to interlock with corresponding hook portions of the fasteners carried by the other of said flexible supporting members, the hook portions of the fasteners carried by each of said flexible supporting members being alternately positioned on opposite sides of the corresponding flexible supporting members and the corresponding hook portions of corresponding fasteners carried by the two flexible supporting members being opposed the one to the other and pointed in opposite directions, and means associated with said flexible supporting members and the fasteners carried by the same normally tending by a torsional force to cause the fasteners carried by one of said flexible supporting members to become engaged with the fasteners carried by the other of said flexible supporting members.

2. A flexible fastener comprising a plurality of flexible supporting members, a plurality of fasteners carried by each of said members, the fasteners carried by one of said flexible supporting members having hook portions adapted to interlock with corresponding hook portions of the fasteners carried by the other of said flexible supporting members, the hook portions of the fasteners carried by each of said flexible supporting members being alternately positioned on opposite sides of the corresponding flexible supporting members and the corresponding hook portions of the corresponding fasteners carried by the two flexible supporting members being opposed the one to the other and pointed in opposite directions, and means associated with said flexible supporting members and the fasteners carried by the same normally tending by a torsional force in one direction of its movement longitudinally of said flexible supporting members to cause the engagement, and in the opposite direction of its movement longitudinally of said flexible supporting members to cause the disengagement, of the fasteners carried by one of said flexible supporting members with respect to the fasteners carried by the other of said flexible supporting members.

3. A flexible fastener comprising a plurality of flexible supporting members, a plurality of fasteners carried by each of said members, the fasteners carried by one of said flexible supporting members having hook portions adapted to interlock with corresponding hook portions of the fasteners carried by the other of said flexible supporting members, the hook portions of the fasteners carried by each of said flexible supporting members being alternately positioned on opposite sides of the corresponding flexible supporting members and the corresponding hook portions of corresponding fasteners carried by the two flexible supporting members being opposed the one to the other and pointed in opposite directions, in combination with an operating member associated with said supporting members and the fasteners carried thereby and adapted in one direction of its movement longitudinally of said flexible supporting members to cause the engagement, and in the opposite direction of its movement longitudinally of said flexible supporting members to cause the disengagement, of the fasteners carried by one of said flexible supporting members with respect to the fasteners carried by the other of said flexible supporting members.

4. A flexible fastener comprising a plurality of flexible supporting members, and a plurality of hook fasteners carried by each of said supporting members, the hook portions of successive fasteners on each supporting member being pointed alternately in opposite directions.

5. A flexible fastener comprising a plurality of flexible supporting members, and a plurality of hook fasteners carried by each of said supporting members, the hook portions of successive fasteners on each supporting member being pointed alternately in opposite directions and the hook portions of cooperating pairs of fasteners on the cooperating supporting members being likewise pointed in opposite directions.

6. A flexible fastener comprising a plurality of flexible supporting members, and a plurality of hook fasteners carried by each of said supporting members, the hook portions of successive fasteners on each supporting member being pointed alternately in opposite directions, in combination with an operating member associated with said supporting members and the fasteners carried thereby for operating said flexible fastener into and out of closed position.

7. A flexible fastener comprising a plurality of flexible supporting members, and a plurality of hook fasteners carried by each of said supporting members, the hook portions of successive fasteners on each supporting member being pointed alternately in opposite directions and the hook portions of cooperating pairs of fasteners on the cooperating supporting members being likewise pointed in opposite directions, in combination with an operating member associated with said supporting members and the fasteners carried thereby for operating said flexible fastener into and out of closed position.

8. A flexible fastener comprising a plurality of flexible supporting members, and a plurality of hook fasteners carried by each of said supporting members, the hook portions of successive fasteners on each supporting member being pointed alternately in opposite directions, in combination with an operating member associated with said supporting members and the fasteners carried thereby and acting by torsional force for operating said flexible fastener into and out of closed position.

9. A flexible fastener comprising a plurality of flexible supporting members, and a plurality of hook fasteners carried by each of said supporting members, the hook portions of successive fasteners on each supporting member being pointed alternately in opposite directions and the hook portions of cooperating pairs of fasteners on the cooperating supporting members being likewise pointed in opposite directions, in combination with an operating member associated with said supporting members and the fasteners carried thereby and acting by torsional force for operating said flexible fastener into and out of closed position.

In testimony whereof, I have signed my name to this specification this 28th day of Jan., 1925.

NOEL STATHAM.